United States Patent
Godoy et al.

(10) Patent No.: US 8,032,484 B2
(45) Date of Patent: Oct. 4, 2011

(54) CREATION OF GENERIC HIERARCHIES

(75) Inventors: Glenn C. Godoy, Endwell, NY (US);
Mark A. Musa, Brackney, PA (US);
David G. Ruest, Vestal, NY (US);
Debora A. Villella, Charlotte, NC (US);
Sherry L. Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 11/693,753

(22) Filed: Mar. 30, 2007

(65) Prior Publication Data

US 2008/0243876 A1 Oct. 2, 2008

(51) Int. Cl.
*G06F 7/00* (2006.01)
*G06F 17/00* (2006.01)

(52) U.S. Cl. .................................... 707/602; 707/793

(58) Field of Classification Search .................. 707/602
See application file for complete search history.

(56) References Cited

U.S. PATENT DOCUMENTS

| | | | |
|---|---|---|---|
| 5,396,623 A | 3/1995 | McCall et al. | |
| 5,428,772 A * | 6/1995 | Merz | 707/4 |
| 6,138,121 A | 10/2000 | Costa et al. | |
| 6,381,600 B1 * | 4/2002 | Lau | 707/6 |
| 6,687,704 B1 * | 2/2004 | Russell | 707/100 |
| 6,963,861 B1 * | 11/2005 | Boucher et al. | 705/400 |
| 6,999,966 B2 | 2/2006 | Liang et al. | |
| 7,051,043 B2 | 5/2006 | Cameron et al. | |
| 2001/0027455 A1 * | 10/2001 | Abulleil et al. | 707/102 |
| 2003/0187855 A1 * | 10/2003 | Fachat et al. | 707/100 |
| 2004/0034634 A1 * | 2/2004 | Ichihara | 707/6 |
| 2005/0196742 A1 * | 9/2005 | Harber et al. | 434/362 |
| 2006/0080324 A1 | 4/2006 | Bower et al. | |
| 2006/0136363 A1 | 6/2006 | Nguyen et al. | |
| 2007/0239769 A1 * | 10/2007 | Fazal et al. | 707/102 |

FOREIGN PATENT DOCUMENTS

WO        WO 9707470        2/1997

OTHER PUBLICATIONS

"New DB2 Table Model Which Minimizes Number of Tables and Allows Higher Scalability", RD n441; Jan. 2001; Article 159, p. 165.

* cited by examiner

*Primary Examiner* — John R. Cottingham
*Assistant Examiner* — Nicholas E Allen
(74) *Attorney, Agent, or Firm* — Scully, Scott, Murphy & Presser, P.C.; John Pivnichny

(57) ABSTRACT

A method and system are disclosed for modeling a relational database. The method comprises the steps of defining a set of data tables to accommodate any number of levels of a business hierarchy and using these tables as a generic data model to handle various levels of requirements of the business hierarchy. This set of tables include a first control table, a second table containing hierarchy nodes in a flattened format, a third table storing unique hierarchy node names, and a fourth table describing the hierarchy nodes in one or more languages. For example, this business hierarchy may be a commodity hierarchy, a geography hierarchy and a client organization hierarchy. Also, in the preferred embodiment, no new tables are needed when a new hierarchy is introduced, and the generic data model supports different numbers of reporting levels from one hierarchy to the next hierarchy.

7 Claims, 6 Drawing Sheets

CREATION OF GENERIC HIERARCHIES

BACKGROUND OF THE INVENTION

1. Field of the Invention

This invention generally relates to data management, and more specifically, the invention relates to methods and systems for creating hierarchies of data. Even more specifically, the preferred embodiment of the invention relates to such methods and systems for implementing a configurable hierarchy, where given hierarchies can be configured without the creation of new database tables.

2. Background Art

A foundational concept in Information Warehouses and reporting against such warehouses is the concept of reporting hierarchies. An example of a reporting hierarchy would be a geography hierarchy. For example, city belongs to a county, a county to a state, a state to a country, a country to a continent, a continent to a hemisphere. A portion of a business might use this particular hierarchy. However, a similar geography hierarchy could include country belongs to a sales region, a sales region belongs to a marketing area, and a marketing area belongs to a sales geography. These combinations are endless and can change based on the business function that is doing the reporting. There are other hierarchy types, like organizations or commodities (product types). There are certain common concepts to hierarchies and then there are unique differences in hierarchies.

As an example, consider a project to aggregate the spend data for many corporations in one information warehouse. This requires supporting many hierarchy types (commodity, geography, organization, etc), and requires supporting the unique hierarchy needs of any corporation for a given hierarchy. The hierarchies could have different numbers of levels based on the corporation and the hierarchy type, and each level could have a different label and a different meaning. The project also requires that new corporations can be brought in without having to create new database table designs (or to generate new schemas), which would slow the onboarding of new corporations. In order to achieve all this, a configurable method for creating new hierarchies is needed.

SUMMARY OF THE INVENTION

An object of this invention is to provide a configurable method and system for creating new hierarchies.

Another object of the present invention is to implement a configurable hierarchy, where different hierarchies can be configured without the creation of new database tables.

A further object of the invention is to provide a generic data model approach to handling the requirements of different types of hierarchies of data.

These and other objectives are attained with a method of and system for modeling a relational database. The method comprises the steps of defining a set of data tables to accommodate any number of levels of a business hierarchy and using said set of data tables as a generic data model to handle various levels of requirements of the business hierarchy. This set of data tables includes a first control table, a second table containing hierarchy nodes in a flattened format, a third table storing unique hierarchy node names, and a fourth table describing the hierarchy nodes in one or more languages.

For example, this business hierarchy may be a commodity hierarchy, a geography hierarchy and a client organization hierarchy. Also, in the preferred embodiment, no new tables are needed when a new hierarchy is introduced, and the generic data model supports different numbers of reporting levels from one hierarchy to the next hierarchy.

The preferred embodiment of the invention, described below in detail, implements a configurable hierarchy, where different hierarchies can be configured without the creation of new database tables. A new hierarchy type is configurable for a given hierarchy type, and the number of levels in the hierarchy is configurable (within a selected maximum). The labels of each level are configurable, these labels can be translated into many languages, and a database view is created. With the preferred embodiment of the invention, this is all done without the creation of new database tables.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The present invention relates to a database design for a generic hierarchy structure that will meet the hierarchy dimension requirements. A hierarchy is a data structure where a child node has one and only one parent node. This data dimension concept is used for rolling up data from a low level up to a higher level. In order for a dimensional hierarchy to work, there must be an entry point or anchor point in the measurement structure. An example is that for a country hierarchy to work for invoice data, then a country code must exist on the invoice record and that country code must match one of the lowest level nodes on the geography hierarchy. There are requirements for many different types of hierarchies for geography, commodity, and internal client organization. As a new client is onboarded to a particular data warehouse, a variety of new hierarchy structures could be requested. It is desirable to make the hierarchies as configurable as possible so as not to cause a lot of development effort when a new hierarchy is requested. There is a requirement to support multiple languages. There is also a requirement to support a different number of reporting levels from one hierarchy to the next. Entry points might be the lowest level node on several hierarchy types (i.e., CTRY_ISO_CD).

Presented below are two examples that illustrate the present invention. The first example, illustrated in FIGS. 1-3 and Tables I-VI below, is for a geography hierarchy, and the second example, illustrated in FIGS. 4 and 5 and Tables VII-XI below, is for a client organization hierarchy.

Figure 1:
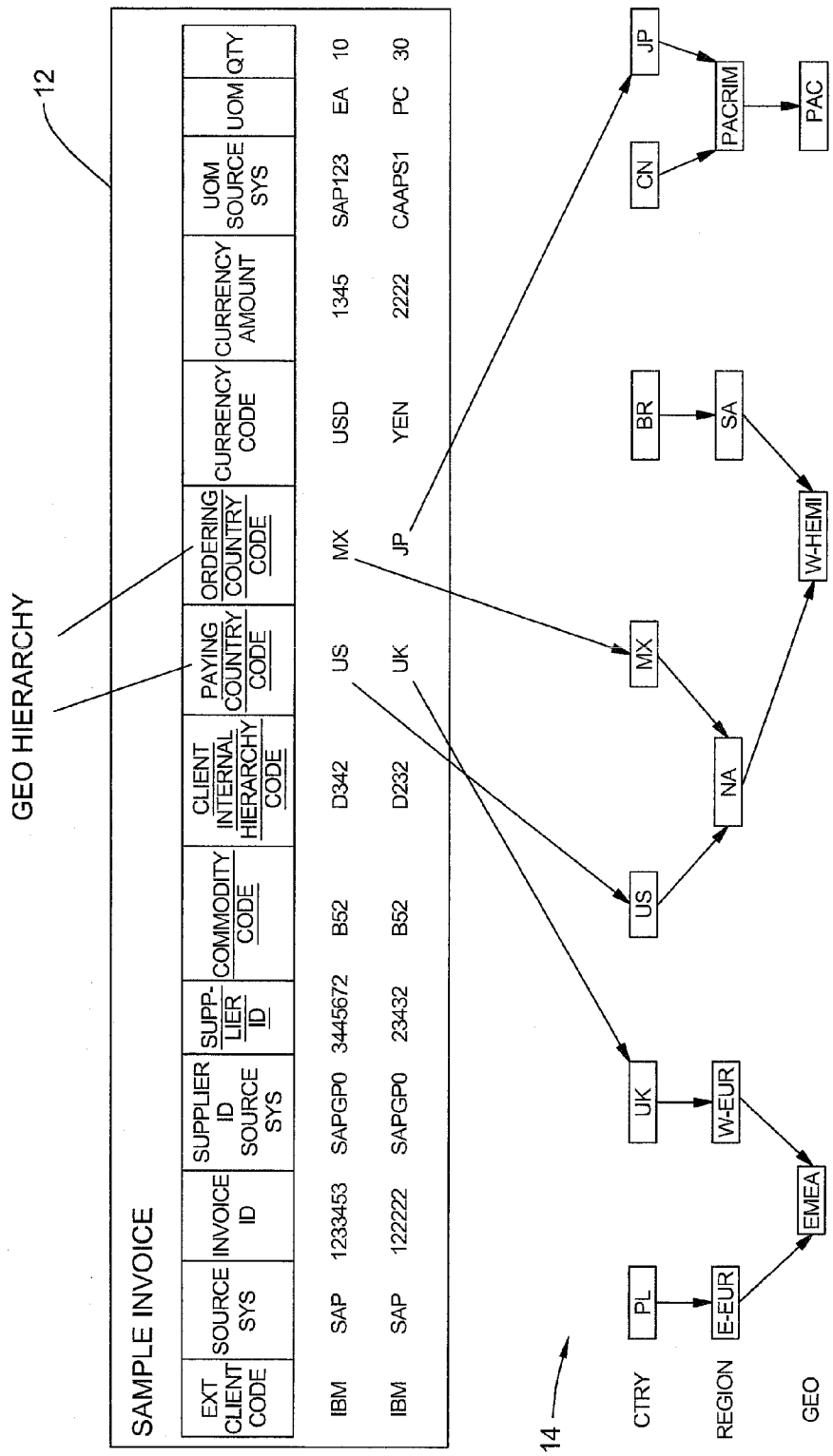
FIGS. 1 and 2 show data arranged in Geography hierarchies.
Figure 2:
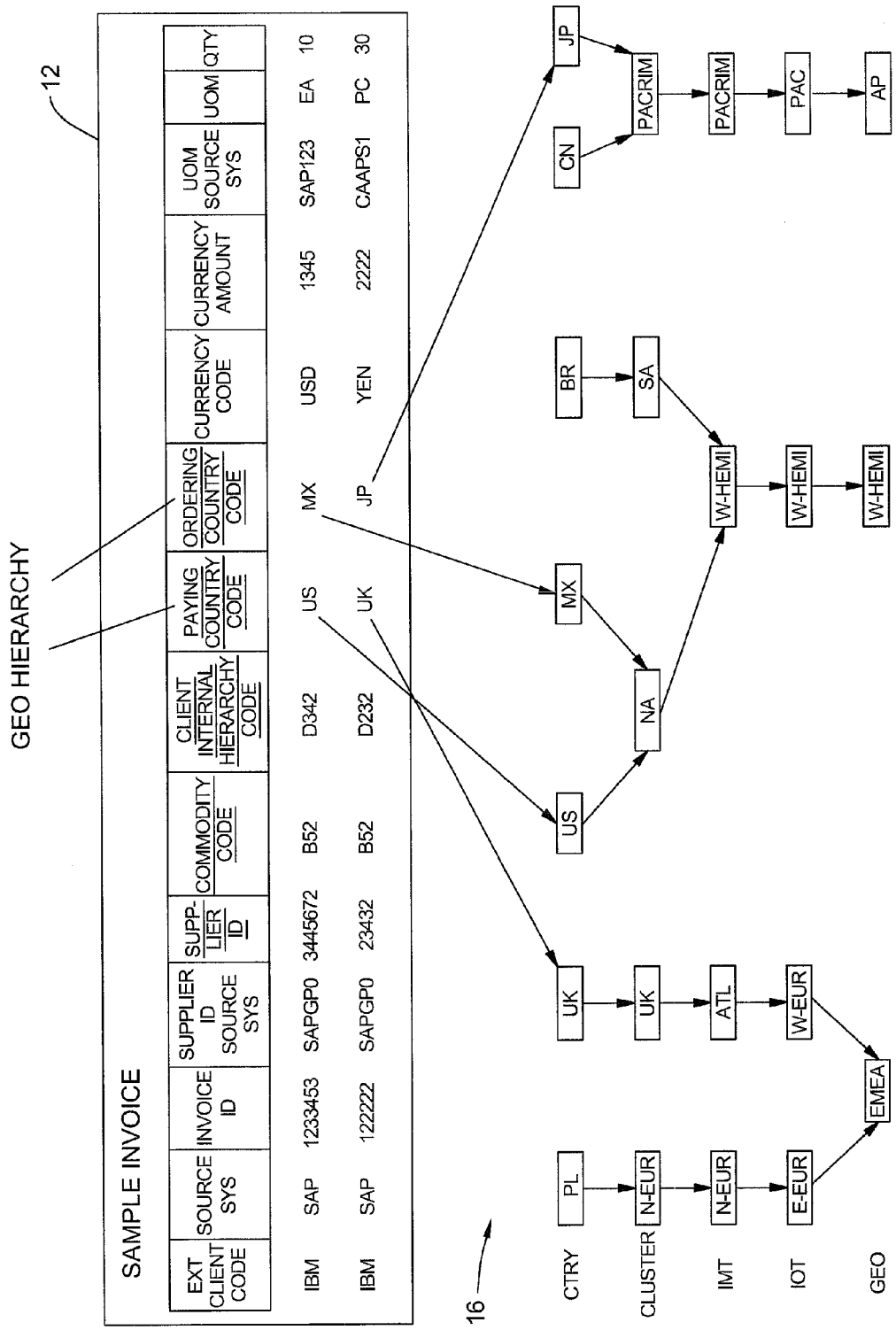

FIGS. 1 and 2 show a sample invoice 12 and two different hierarchies 14 and 16 formed from data in the invoice. The first hierarchy 14, shown in FIG. 1, has three levels named Ctry, Region and Geo. The field Ctry_ISO_CD is the entry point, and the measurement is the invoice.

The second hierarchy 16, shown in FIG. 2, is a five level hierarchy with Ctry, cluster, IMT, IOT and Geo as the levels. In this hierarchy, the field country name is the entry point.

Both of the geography hierarchy structures 14 and 16 shown in FIGS. 1 and 2 are valid, and the database design and process to maintain the various hierarchies will handle these structures and other structures, whether they be geography, commodity, or internal organization, etc. It should be noted that the present invention is not limited to geography, commodity or internal organization hierarchy types, and the invention can be used with any number of unlimited hierarchy types.

Figure 3:
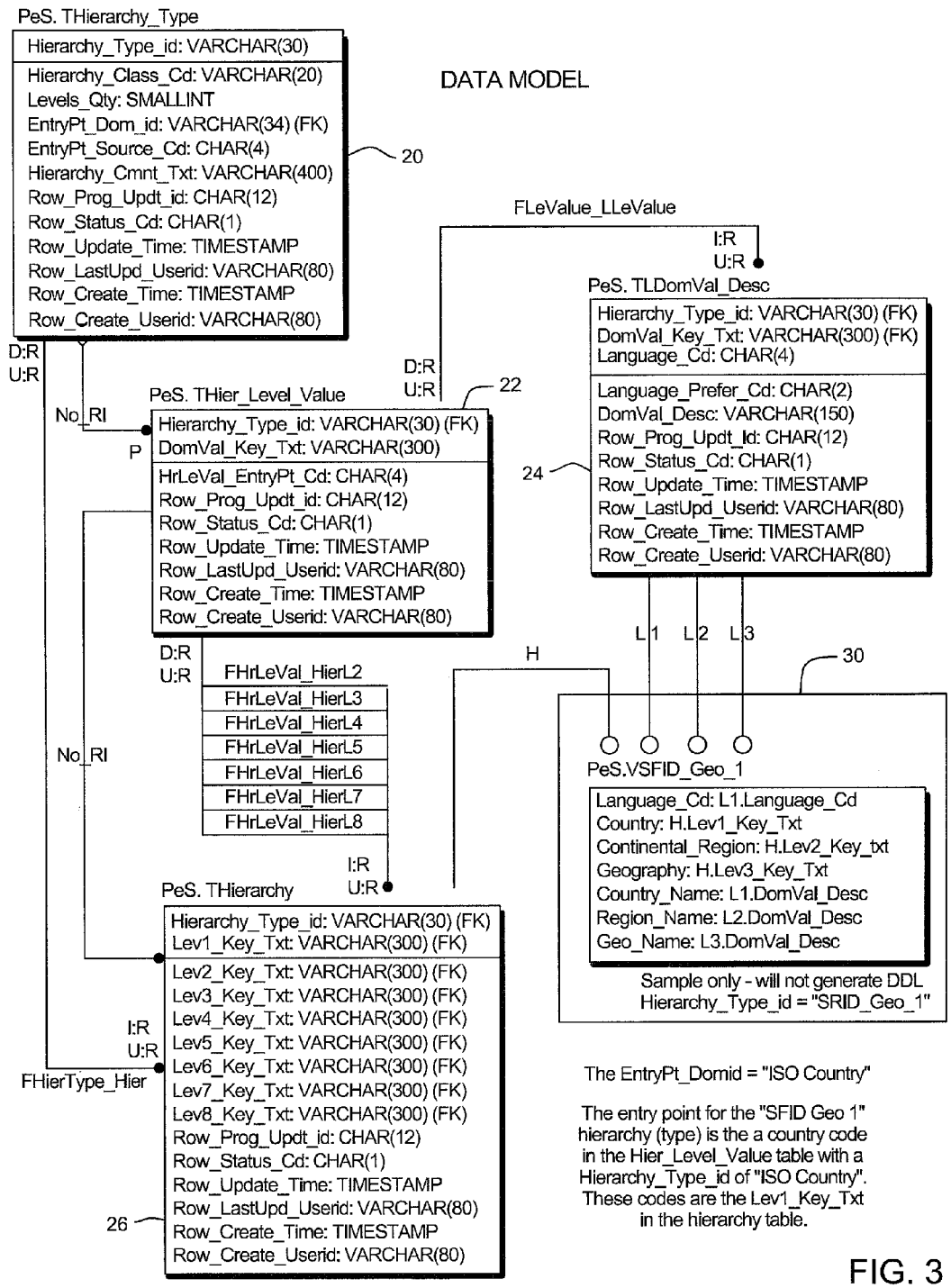
FIG. 3 illustrates a data base design to address the generic hierarchy requirement.

FIG. 3 shows the database design, in accordance with the preferred embodiment of the invention, to address the generic hierarchy requirement. More specifically, FIG. 3 shows five tables: Thierarchy_Type 20; THier_Level_Value 22; TLDomVal_Desc 24; Thierarchy 26; and VSFTD_Geo_1 30.

In this example, the EntryPt_Dom_ID="ISO Country". The entry point for the "SFID Geo 1" hierarchy (type) is the country code in the Hier_Level_Value table with a Hierarchy_Type ID of "ISO Country". These codes are the LEV1Key_Txt in the hierarchy table.

In the discussion immediately below, the first Geo hierarchy will be shown, as it would appear in the database tables.

The following tables, Tables I-V, show the actual values that will need to be maintained and initially populated.

TABLE I

THIERARCHY_TYPE

| Hierarchy Type ID | Hierarchy Class CD | Levels Qty | Entry Pt Domain ID | Entry Pt Source CD | Hierarchy Cmnt Txt |
|---|---|---|---|---|---|
| IBMGEO1 | GEO | 3 | CTRY_ISO_CD | TCOUNTRY | This it the 3 level hierarchy that IBM has used in the past |
| IBMGEO2 | GEO | 5 | enUS_CTRY_NM | | This is the new 5 level hierarchy that supports EMEA's needs |

TABLE II

THIERARCHY

| Hierarchy Type ID | Lev1 Key Txt | Lev2 Key Txt | Lev3 Key Txt | Lev4 Key Txt | Lev5 Key Txt | Lev6 Key Txt | Lev7 Key Txt | Lev8 Key Txt |
|---|---|---|---|---|---|---|---|---|
| IBMGEO1 | PL | E-EUR | EMEA | NONE | NONE | NONE | NONE | NONE |
| IBMGEO1 | UK | W-EUR | EMEA | NONE | NONE | NONE | NONE | NONE |
| IBMGEO1 | US | NA | W-HEMI | NONE | NONE | NONE | NONE | NONE |
| IBMGEO1 | MX | NA | W-HEMI | NONE | NONE | NONE | NONE | NONE |
| IBMGEO1 | BR | SA | W-HEMI | NONE | NONE | NONE | NONE | NONE |
| IBMGEO1 | CN | PACRIM | PAC | NONE | NONE | NONE | NONE | NONE |
| IBMGEO1 | JP | PACRIM | PAC | NONE | NONE | NONE | NONE | NONE |

TABLES III, IV AND V

| THIER_LEVEL_VALUE | | |
|---|---|---|
| Hierarchy Type ID | DomVal Key Txt | HRLevel EntryPt CD |
| CTRY_ISO_CD | BR | 1 |
| CTRY_ISO_CD | BR | 1 |
| CTRY_ISO_CD | PL | 1 |
| CTRY_ISO_CD | UK | 1 |
| CTRY_ISO_CD | US | 1 |
| CTRY_ISO_CD | MX | 1 |
| CTRY_ISO_CD | CN | 1 |
| CTRY_ISO_CD | JP | 1 |
| IBMGEO1 | E-EUR | 0 |
| IBMGEO1 | W-EUR | 0 |
| IBMGEO1 | NA | 0 |
| IBMGEO1 | SA | 0 |
| IBMGEO1 | PACRIM | 0 |
| IBMGEO1 | EMEA | 0 |
| IBMGEO1 | W-HEMI | 0 |
| IBMGEO1 | NONE | 0 |
| IBMGEO1 | PAC | 0 |

TABLES III, IV AND V-continued

| TDOMAIN_VALUE_DESC | | | | |
|---|---|---|---|---|
| Hierarchy Type ID | DomVal Key Txt | Language CD | Language Prefer CD | DomVal desc |
| CTRY_ISO_CD | BR | deDE | | Brasilien |
| CTRY_ISO_CD | BR | enUS | | Brazil |
| CTRY_ISO_CD | PL | enUS | | Poland |
| CTRY_ISO_CD | UK | enUS | | United Kingdom |
| CTRY_ISO_CD | US | enUS | | United States |
| CTRY_ISO_CD | MX | enUS | | Mexico |
| CTRY_ISO_CD | CN | enUS | | Canada |
| CTRY_ISO_CD | JP | enUS | | Japan |
| IBMGEO1 | E-EUR | enUS | | Eastern Europe |
| IBMGEO1 | W-EUR | enUS | | Western Europe |
| IBMGEO1 | NA | enUS | | North America |
| IBMGEO1 | SA | enUS | | South America |
| IBMGEO1 | PACRIM | enUS | | Pacific Rim |
| IBMGEO1 | EMEA | enUS | | EMEA |
| IBMGEO1 | W-HEMI | enUS | | Western Hemisphere |
| IBMGEO1 | NONE | enUS | | No Level |
| IBMGEO1 | PAC | enUS | | Pacific |

| | | |
|---|---|---|
| BR | daDK | Brasilien |
| BR | deDE | Brasilien |
| BR | enUS | Brazil |
| BR | esES | Brasil |
| BR | fiFI | Brasilia |
| BR | frCA | Brésil |
| BR | frFR | Brésil |
| BR | itIT | Brasile |
| BR | nlNL | Brazilië |
| BR | noNO | Brasil |
| BR | svSV | Brasilien |
| BR | ptBR | Brasil |
| BR | huHU | Brazilia |

The first table, THIERARCHY_TYPE is an informational table and a control table. This table must be created before any of the children tables can be created. For example, it may be a change request (CR) that may request that a new hierarchy be created and then a series of steps would occur to make that all of the needed tasks are covered.

The next table, THIERARCHY contains the hierarchy nodes in a flattened format. As illustrated in this example, a hierarchy is able to contain up to eight levels. Those levels that are not used contain the value 'NONE'. A user should be able to match the values in this table to the values in the hierarchy picture.

The dotted line box of Table V indicates how the NLS is handled in the table designs.

The fourth table TDOMAIN_VALUE_DESC is where the codes are matched up with the unique names that are stored in the third table THIER_LEVEL_VALUE. These names can be stored in a variety of languages. For example, the names may all be English ('enUS'), but different languages can be handled. There is special consideration given to entry point nodes. In this example, the entry point node has a different HIERARCHY_TYPE_CD call CTRY_ISO_CD. This approach is used so that if different hierarchies wanted to use the same entry point field, they do not have to redefine all the values again.

Table VI below is the database view that is derived from the tables of FIGS. 5-8. It is this view that the user will have access to for each of the hierarchies. Each hierarchy will have its own named view, and the name of the view shown in Table VI is VSRD_GEO_1.

TABLE VI

| VSRD_GEO_1 Hierarchy Type ID | Language CD | Country | Continental Region | Geography | Country Name | Region Name | Geo Name |
|---|---|---|---|---|---|---|---|
| IBMGEO1 | enUS | PL | E-EUR | EMEA | Poland | Eastern Europe | EMEA |
| IBMGEO1 | enUS | UK | W-EUR | EMEA | United Kingdom | Western Europe | EMEA |
| IBMGEO1 | enUS | US | NA | W-HEMI | United States | North America | Western Hemisphere |
| IBMGEO1 | enUS | MX | NA | W-HEMI | Mexico | North America | Western Hemisphere |
| IBMGEO1 | enUS | BR | SA | W-HEMI | Brazil | South America | Western Hemisphere |
| IBMGEO1 | enUS | CN | PACRIM | PAC | China | Pacific Rim | Pacific |
| IBMGEO1 | enUS | JP | PACRIM | PAC | Japan | Pacific Rim | Pacific |

Hierarchy Creation and Registration Steps

There are a series of preferred steps that each new hierarchy goes through. The architect and the data modeler preferably agree to these steps, listed below:

1. Design into all measurement tables a capability for ten generic hierarchy anchor point fields. This is a variable number that is a reasonable number to handle unknown hierarchy requests for a given external client.
2. For a given hierarchy request, describe the business purpose of the hierarchy and then diagram out in some fashion how the hierarchy is expected to work. List the levels and the names of the levels as well as the sample values.
3. The business data owners must document the entry points for every measurement table that will be expected to be able to be rolled up using this hierarchy.
4. Review the proposed hierarchy documented in the top three steps with the data modelers and the architect.
5. Have a proposed method for the initial population and review with the architect.
6. This will drive component requirements for initial load.
7. Determine if assistance is needed in loading any special entry point/anchor fields.
8. Have a proposed method for ongoing maintenance and review with architect.
9. Be sure data integrity queries will work. These queries include:
   a. All codes have a name for a given language and there are no gaps.
   b. Other queries may also be appropriate.
10. Insert the rows in THIERARCHY_TYPE.
11. Code the DB2 view.
12. It may also be appropriate to consider data integrity between the measurement tables and the specific hierarchy entry point that they are expected to roll up thru.

It should be noted that the above-listed process steps relate to the specific environment that this implementation of the invention was used in. These steps are not limiting, but rather are a guide as to a reasonable way to create and maintain a new hierarchy.

Figure 4:
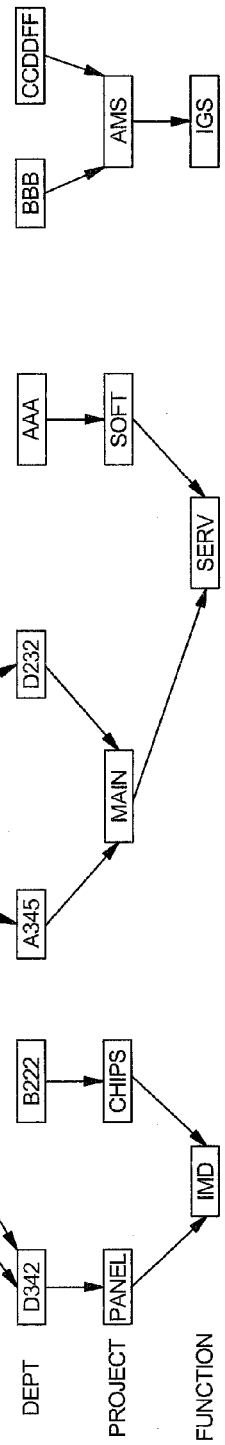
FIGS. 4 and 5 show two examples of data arranged in organization hierarchies.
Figure 5:
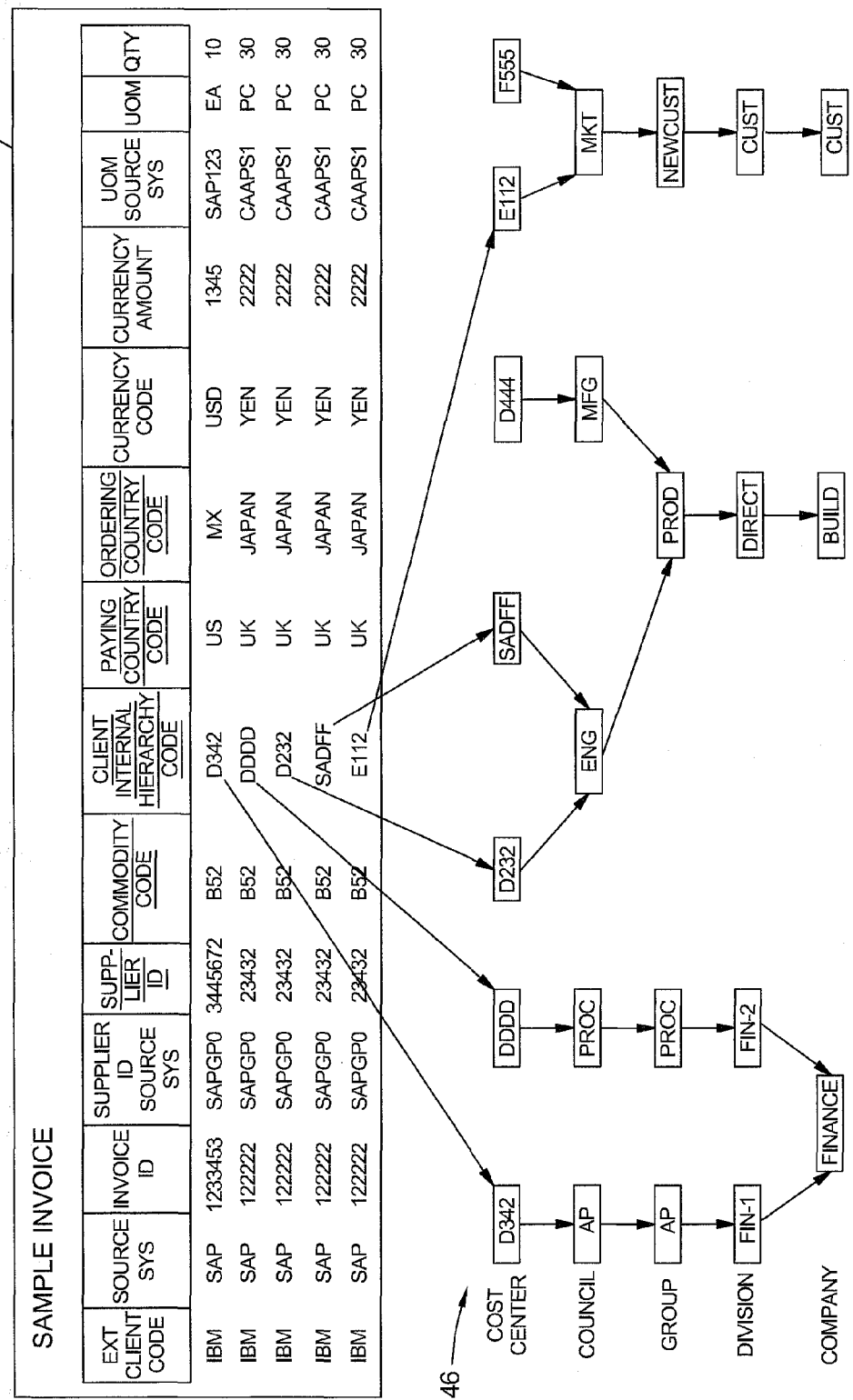

FIGS. 4 and 5 and Tables VII-X below illustrate a second example, which is an organization hierarchy, of the present invention. In particular, FIGS. 4 and 5 show a sample invoice 42 and two hierarchies 44 and 46 formed from data on the invoice. The first hierarchy 44, shown in FIG. 4, has three levels named Dept, Project, and Function, and this hierarchy has an entry point of a column on the invoice called Client_Internal_Hierarchy_Code. The second hierarchy 46, shown in FIG. 5, has five levels named Cost Center, Council, Group, Division, and Company.

The discussion below shows how this Organization Hierarchy table may be implemented using the data model and tables of the present invention.

Tables VII-X below contain sample values for the database tables to implement the first hierarchy.

TABLE VII

| THIERARCHY_TYPE | | | | | |
|---|---|---|---|---|---|
| Hierarchy Type ID | Hierarchy Class CD | Levels Qty | Entry Pt Domain ID | Entry Pt Source CD | Hierarchy Cmnt Txt |
| IBMORG01 | ORG | 3 | COST CENTER | TCOST_CENTER | This it the 3 level hierarchy that IBM has used in the past |
| IBMORGO2 | ORG | 5 | COST CENTER | TCOST_CENTER | This is the new 5 level hierarchy that supports EMEA's needs |

TABLE VIII

| THIERARCHY | | | | | | | | |
|---|---|---|---|---|---|---|---|---|
| Hierarchy Type ID | Lev1 Key Txt | Lev2 Key Txt | Lev3 Key Txt | Lev4 Key Txt | Lev5 Key Txt | Lev6 Key Txt | Lev7 Key Txt | Lev8 Key Txt |
| IBMORG01 | D342 | PANEL | IMD | NONE | NONE | NONE | NONE | NONE |
| IBMORG01 | D222 | CHIPS | IMD | NONE | NONE | NONE | NONE | NONE |
| IBMORG01 | A345 | MAIN | SERV | NONE | NONE | NONE | NONE | NONE |
| IBMORG01 | D232 | MAIN | SERV | NONE | NONE | NONE | NONE | NONE |
| IBMORG01 | AAA | SOFT | SERV | NONE | NONE | NONE | NONE | NONE |
| IBMORG01 | BBB | AMS | IGS | NONE | NONE | NONE | NONE | NONE |
| IBMORG01 | CCDDFF | AMS | IGS | NONE | NONE | NONE | NONE | NONE |

TABLE IX

THIER_LEVEL_VALUE

| Hierarchy Type ID | DomVal Key Txt | HRLevel EntryPt CD |
|---|---|---|
| COST_CENTER | D342 | 1 |
| COST_CENTER | B222 | 1 |
| COST_CENTER | A345 | 1 |
| COST_CENTER | D232 | 1 |
| COST_CENTER | AAA | 1 |
| COST_CENTER | BBB | 1 |
| COST_CENTER | CCDDFF | 1 |
| IBMORG01 | PANEL | 0 |
| IBMORG01 | CHIPS | 0 |
| IBMORG01 | MAIN | 0 |
| IBMORG01 | SOFT | 0 |
| IBMORG01 | AMS | 0 |
| IBMORG01 | IMD | 0 |
| IBMORG01 | SERV | 0 |
| IBMORG01 | IGS | 0 |
| IBMORG01 | NONE | 0 |

TABLE X

TDOMAIN_VALUE_DESC

| Hierarchy Type ID | DomVal Key Txt | Language CD | Language Prefer CD | Value Desc |
|---|---|---|---|---|
| COST_CENTER | D342 | deDE | | Panichbun poofen |
| COST_CENTER | D342 | enUS | | Panel Design |
| COST_CENTER | B222 | enUS | | Chip design |
| COST_CENTER | A345 | enUS | | s390 Engineer |
| COST_CENTER | D232 | enUS | | s390 Mfg |
| COST_CENTER | AAA | enUS | | Software design |
| COST_CENTER | BBB | enUS | | ISC Architecture |
| COST_CENTER | CCDDFF | enUS | | ISC Test |
| IBMORG01 | PANEL | enUS | | Panel |
| IBMORG01 | CHIPS | enUS | | Chips |
| IBMORG01 | MAIN | enUS | | Mainframe |
| IBMORG01 | SOFT | enUS | | Software |
| IBMORG01 | AMS | enUS | | AMS |
| IBMORG01 | IMD | enUS | | IBM Micro Div |
| IBMORG01 | SERV | enUS | | Server |
| IBMORG01 | IGS | enUS | | Global Services |
| IBMORG01 | NONE | enUS | | no level |

The first table, THIERARCHY_TYPE is an informational table and a control table. This table must be created before any of the children tables can be created. With this example also, it may be a change request (CR) that may request that a new hierarchy be created and then a series of steps would occur to make sure that all of the needed tasks are covered.

The next table, THIERARCHY contains the hierarchy nodes in a flattened format. As illustrated in this example, a hierarchy is able to contain up to eight levels. Those levels that are not used contain the value 'NONE'. A user should be able to match the values in this table to the values in the hierarchy picture.

The fourth table TDOMAIN_VALUE_DESC is where the codes are matched up with the unique names that are stored in the third table THIER_LEVEL_VALUE. These names can be stored in a variety of languages. For example, the names may all be English ('enUS'), but different languages can be handled. There is special consideration given to entry point nodes. In this example, the entry point node has a different HIERARCHY_TYPE_CD call CTRY_ISO_CD. This approach is used so that if different hierarchies wanted to use the same entry point field, they do not have to redefine all the values again.

Table XI below is the database view that is derived from the Tables VII-X. It is this view that the user will have access to for each of the hierarchies. Each hierarchy will have its own named view, and the name of the view shown in Table XI is VSRD_IBMORG01.

TABLE XI

| VSRD_IBMORG01 Hierarchy Type ID | Language CD | Dept | Project | Function | Dept Name | Project Name | Function Name |
|---|---|---|---|---|---|---|---|
| IBMORG01 | enUS | D342 | PANEL | IMD | Panel Design | Panel | IBM Micro Div |
| IBMORG01 | enUS | B222 | CHIPS | IMD | Chip design | Chips | IBM Micro Div |
| IBMORG01 | enUS | A345 | MAIN | SERV | s390 Engineer | Mainframe | Server |
| IBMORG01 | enUS | D232 | MAIN | SERV | s390 Mfg | Mainframe | Server |
| IBMORG01 | enUS | AAA | SOFT | SERV | Software design | Software | Server |
| IBMORG01 | enUS | BBB | AMS | IGS | ISC Architecture | AMS | Global Services |
| IBMORG01 | enUS | CCDDFF | AMS | IGS | ISC Test | AMS | Global Services |
| | | XXXXXXXXXXXXXXXXXXXX | | | | | |

Figure 6:
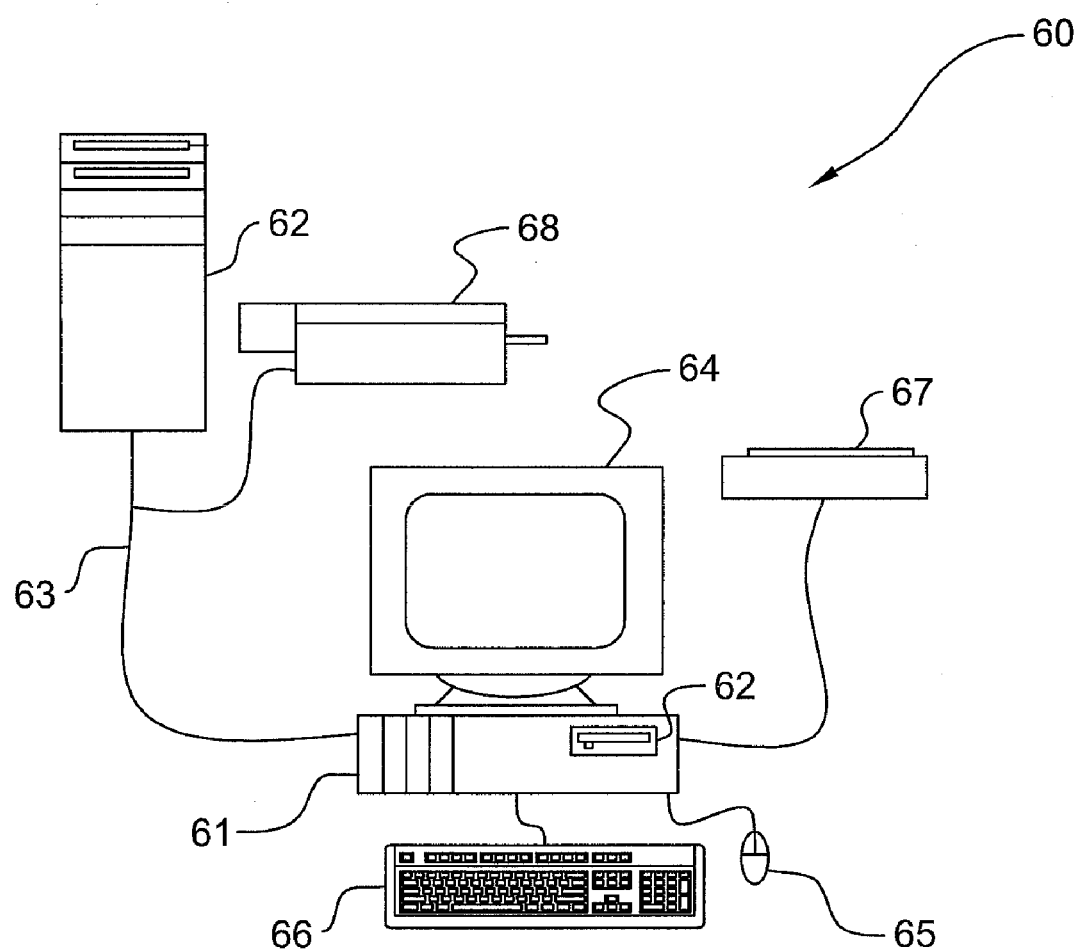
FIG. 6 shows a computer system that may be used in the implementation of this invention.

The method of the present invention will be generally implemented by a computer executing a sequence of program instructions for carrying out the steps of the method and may be embodied in a computer program product comprising media storing the program instructions. Referring to FIG. 6, a computer system 60 is depicted on which the method of the present invention may be carried out. Processing unit 61, houses a processor, memory and other systems components that implement a general purpose processing system that may execute a computer program product comprising media, for example a floppy disc that may be read by processing unit 61 through floppy drive 62.

The program product may also be stored on hard disk drives within processing unit 61 or may be located on a remote system 62 such as a server, coupled to processing unit 61, via a network interface, such as an Ethernet interface, represented at 63. Monitor 64, mouse 65 and keyboard 66 are coupled to processing unit 41, to provide user interaction. Scanner 67 and printer 68 are provided for document input and output. Printer 68 is shown coupled to processing unit 61 via a network connection, but may be coupled directly to the processing unit. Scanner 67 is shown coupled to processing unit 61 directly, but it should be understood that peripherals may be network coupled or direct coupled without affecting the ability of workstation computer 60 to perform the method of the invention.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of modeling and using a relational database creating a multitude of hierarchies, each of the hierarchies including a multitude of nodes arranged in two or more levels, the method comprising the steps of:
    defining a set of data tables to accommodate any number of levels of a business hierarchy, said set of data tables including:
    a first information and control table identifying first and second hierarchies,
    a second table identifying in a flattened format the nodes of the first and second hierarchies, and for each of a subset of the nodes of each of the hierarchies, identifying a parent node for said each node of said each hierarchy,
    a third table storing names for the nodes of the hierarchies and a data entry point for each of the hierarchies, and
    a fourth table describing languages;
    using said set of data tables as a generic data model to handle various levels of requirements of the business hierarchy;
    the hierarchy;
    using a computer system configured to implement and to implement the defining and using steps;
    designing into measurement tables a capability for a given number of generic hierarchy anchor point fields;
    for a given hierarchy request, describing a purpose of the given hierarchy, and listing levels of the given hierarchy, names of the levels, and sample values;
    documenting entry points for each of the measurement tables; and
    using the first, second, third and fourth tables to generate said first and second hierarchies, each of said hierarchies being a hierarchical order of data from the relational database;
    wherein no additional data tables are needed to generate a further hierarchy of data from the relational database.

2. A method according to claim 1, wherein the generic data model supports different numbers of reporting levels from one hierarchy to a next hierarchy.

3. A method according to claim 1, comprising the further step of obtaining a given set of data, and wherein the using step includes the step of using said generic data model to organize said given set of data in said business hierarchy.

4. A method according to claim 3, wherein the step of using said generic data model includes the step of matching values in the second table to values in the business hierarchy.

5. A method according to claim 4, wherein the fourth table includes codes, and the method comprises the further step of matching said codes with the names stored in the third table.

6. The method according to claim 1, wherein the computer system includes hardware for performing at least one of said defining and using steps.

7. The method according to claim 1, wherein:
    the data tables describe different configurations for the different hierarchies, including different levels of nodes;
    the entry point for each of the hierarchies identifies the lowest level of the nodes of said each hierarchy;
    the set of data tables includes a fifth table identifying geographic regions; and
    the first data table includes entry points to the second and third data tables, the second data table includes an entry point to the fourth data table, and the third and fourth tables include entry points to the fifth table.

* * * * *